(12) United States Patent
Du et al.

(10) Patent No.: US 11,427,469 B2
(45) Date of Patent: Aug. 30, 2022

(54) PREPARATION METHOD FOR INSOLUBLE SULFUR AND ANTI-REVERSION STABILIZER USED THEREBY

(71) Applicant: SHANDONG YANGGU HUATAI CHEMICAL CO., LTD., Shandong (CN)

(72) Inventors: Mengcheng Du, Shandong (CN); Qingfei Guo, Shandong (CN); Weimin Wang, Shandong (CN)

(73) Assignee: SHANDONG YANGGU HUATAI CHEMICAL CO, LTD., Shandong (CN)

( * ) Notice: Subject to any disclaimer, the term of this patent is extended or adjusted under 35 U.S.C. 154(b) by 0 days.

(21) Appl. No.: 17/253,110

(22) PCT Filed: Aug. 21, 2019

(86) PCT No.: PCT/CN2019/101663
§ 371 (c)(1),
(2) Date: Dec. 16, 2020

(87) PCT Pub. No.: WO2020/088047
PCT Pub. Date: May 7, 2020

(65) Prior Publication Data
US 2021/0269309 A1   Sep. 2, 2021

(30) Foreign Application Priority Data

Nov. 2, 2018 (CN) .......................... 201811300736.5

(51) Int. Cl.
*C01B 17/02* (2006.01)
*C01B 17/12* (2006.01)

(52) U.S. Cl.
CPC .......... *C01B 17/12* (2013.01); *C01B 17/0216* (2013.01); *C01B 17/0226* (2013.01); *C01B 17/0237* (2013.01); *C01B 17/0248* (2013.01); *C01P 2006/37* (2013.01)

(58) Field of Classification Search
CPC ..... C01B 17/00; C01B 17/02; C01B 17/0243; C01B 17/0248; C01B 17/10; C01B 17/12; C01B 17/0226; C01B 17/0237; C01B 17/0216; C01P 2006/37
See application file for complete search history.

(56) References Cited

U.S. PATENT DOCUMENTS

| 3,431,214 A * | 3/1969 | McDonald .......... C01B 17/0248 252/182.11 |
| 3,661,530 A * | 5/1972 | Block ................. C01B 17/0248 423/268 |
| 4,210,458 A * | 7/1980 | Simic .................. C01B 17/0243 106/287.23 |
| 7,514,064 B2 * | 4/2009 | Stecher .................. C01B 17/02 423/574.1 |

FOREIGN PATENT DOCUMENTS

| CN | 105502303 A | 4/2016 |
| CN | 106829876 A | 6/2017 |
| CN | 109368599 A | 2/2019 |
| WO | WO2004018356 A1 | 3/2004 |

* cited by examiner

*Primary Examiner* — Timothy C Vanoy

(57) ABSTRACT

Provided are a preparation method for insoluble sulfur and an anti-reversion stabilizer used thereby. Methane is used as the anti-reversion stabilizer. The methane is added to liquid sulfur at sulfur gasification stage, and is cracked into active free radicals under the action of sulfur vapor active free radicals; in the quenching process of sulfur vapor mixed with methane, the active free radicals generated by methane cracking carry out end capping on insoluble sulfur end groups generated by sulfur vapor polymerization, thus completing insoluble sulfur stabilization. The methane is added at liquid sulfur gasification stage, and after sulfur gasification, the methane is mixed with sulfur vapor in a gaseous form, rather than being added to the product in a solid or liquid manner at a later stage, so that the insoluble sulfur and the stabilizer can be uniformly contacted and mixed to the greatest extent.

9 Claims, No Drawings

PREPARATION METHOD FOR INSOLUBLE SULFUR AND ANTI-REVERSION STABILIZER USED THEREBY

BACKGROUND OF THE INVENTION

1. Field of the Invention

The invention relates to an anti-reversion stabilizer for insoluble sulfur and a preparation method for preparing insoluble sulfur with low reversion by using the anti-reversion stabilizer.

2. Description of the Related Art

The insoluble sulfur is polymerized sulfur which is obtained by common sulfur via thermal polymerization and quenching, which is insoluble in carbon disulfide; the basic production technology process can be divided into the following steps: melting and heating sulfur, quenching, solidifying, extracting, filtering, drying, screening and filling oil. As a high-grade accelerator and a vulcanization crosslinking agent in the rubber industry, the insoluble sulfur has the advantages of no blooming, improvement of the adhesive strength among layers of a multi-layer rubber product, effective reduction of scorching phenomenon during storage of rubber materials and the like. The method is an essential and important raw material in the production of tires, particularly in the production of all-steel radial tires of automobiles.

Compared with common sulfur, the insoluble sulfur is a polymerization state of sulfur, and if the end capping is not conducted, the insoluble sulfur has the tendency of being restored to the common sulfur at room temperature. The material used for capping is generally referred to as a stabilizer. The addition mode and the end capping effect of the stabilizer directly influence the thermal stability level of the product and the storage stability of the product, so the type and the addition mode of the stabilizer are important factors influencing the quality of insoluble sulfur products. The stabilizers can be divided into pre-stabilizers and post-stabilizers, depending on whether they are added before and after quenching, the pre-stabilizer being added before quenching and capable of participating in the reaction during the sulphur free radicals polymerization stage, and the post-stabilizer being added after quenching. At present, most of the used stabilizers are post-stabilizers, and are generally added before quenching and drying insoluble sulfur and in the process of oil filling.

For example, Chinese patent CN108203082A discloses an insoluble sulfur stabilizer and its adding method, which extracts insoluble sulfur and mixes with the stabilizer, and drying. The stabilizer adopts ammonium sulfate and ethyl sodium xanthate. The stabilizer is mixed in the drying process to realize contact with insoluble sulfur, so as to realized end capping.

Patent CN104724679A discloses an oil-filled insoluble sulfur, its preparation method and application, and application of ionic liquid as a stabilizer, wherein the ionic liquid is used as a stabilizer in the oil-filling process of insoluble sulfur, and anions of the ionic liquid can interact with two end groups of insoluble sulfur, so that the end group sulfur forms a saturated stable structure of 8 electrons. The anion of the ionic liquid is selected from halide ion, $ClO_4^-$, $AlCl_4^-$, $CuCl_2^-$, $Cu_2Cl_3^-$, $BF_4^-$, $PF_6^-$, $CF_3SO_3^-$, $PO_3^-$, and $NO_3^-$. The stabilizer is added into the naphthenic oil, and the end capping is realized by the contact with insoluble sulfur through the oil-filling process.

Patent CN102730648A discloses a stabilizer in the quenching and coating process, wherein the stabilizer added in the quenching process is a mixture of olefin containing unsaturated bonds and halide; the stabilizer in the coating process is added with a high molecular material to coat the insoluble sulfur powder, wherein the high molecular material is added into the insoluble sulfur powder via solvent dissolution; the solvent is carbon disulfide, dichloromethane, chloroform, benzene, toluene, acetone, etc. The process adds stabilizer through the quenching process and the coating process.

For example, patent CN106145056A provides a method for preparing high thermal stability insoluble sulfur by using an arene end-capping agent containing carbonium ion structure, in which a certain amount of a compound providing carbonium ion structure and strong acid are added into the quenching liquid, and under an acidic condition, the corresponding groups are removed to form carbonium ions to perform end-capping reaction. The content of the carbonium ions of the arene end-capping agent added in the quenching process can change in the recycling process, and the removed groups are accumulated and remained in the product, which will influence the thermal stability of the product.

In summary, the stabilizers mentioned in the prior patents are mostly post-stabilizers. When the post-stabilizer is added, the insoluble sulfur becomes solid, the stabilizer is generally liquid or solid, and the reaction speed of the insoluble sulfur and the stabilizer is slow. In addition, the system has a large amount of substances such as carbon disulfide or naphthenic oil, which further influences the contact and reaction between the stabilizer and insoluble sulfur, so the post-stabilizer has a plurality of defects.

The patent CN106995207A provides a preparation technology for high-grade insoluble sulfur via melting method, which comprises the steps of putting industrial sulfur powder raw materials, stearic acid and zinc oxide into a high-temperature reaction kettle, heating to 140° C. under the atmosphere of nitrogen, preserving heat for 30 min, then adding stabilizer and oleamide, stirring, heating to 250-260° C., and carrying out polymerization reaction for 2-2.5 h to obtain a molten material. The stabilizer in the patent is pre-stabilizer and is added in the stage of melt polymerization, but the stabilizer is carbonized at high temperature, and the black spots of insoluble sulfur finished products are increased, thus influencing the quality of the products.

SUMMARY OF THE INVENTION

Aiming at the defects that the pre-stabilizers in the prior art is insufficient in report, the invention provides an anti-reversion stabilizer for insoluble sulfur and the effective component thereof comprises methane, which is added before quenching and serves as the pre-stabilizer; the methane is more uniformly contacted with the raw material, can improve the reversion property of the insoluble sulfur, and provides a new choice for the insoluble sulfur stabilizer.

The invention also provides a preparation method for the insoluble sulfur, which uses the stabilizer with the effective component of methane, improves the reversion property of the obtained insoluble sulfur and improves the thermal stability and the quality of the product.

The specific technical solution for the invention is as follows:

After study, the invention finds that methane can improve the anti-reversion property of the insoluble sulfur, can improve the high-temperature stability of the insoluble sulfur, therefore, the invention has provided the application of methane as anti-reversion stabilizer for the insoluble sulfur, which also provides an anti-reversion stabilizer for insoluble sulfur and the effective component thereof is methane, offering a novel choice for anti-reversion stabilizer for insoluble sulfur; methane can be either used alone or used with other stabilizers together, for example methane is used to stabilize in stage of sulfur melt polymerization, then other stabilizers are added to stabilize in stages such as quenching, drying, oil filling, etc. Or methane may be compounded with other stabilizers that may be used in the melt polymerization stage for stabilization, etc.

The invention also provides a preparation method for the insoluble sulfur comprising the steps of heating and gasifying the liquid sulfur to obtain sulfur vapor, which is characterized in that methane is firstly added into the liquid sulfur, and then the liquid sulfur is gasified.

Furthermore, a certain amount of gaseous methane is introduced into the liquid sulphur before the sulphur vapour is formed. Preferably, the mass ratio of the methane to the liquid sulfur is $10^{-3} \sim 10^{-5}:1$, and more preferably $10^{-3} \sim 10^{-4}:1$. During adding, controlling the methane introducing speed so that methane is slowly introduced into the liquid sulfur and the methane is uniformly mixed with the liquid sulfur in the adding process; reducing the mixing time for the methane and the sulfur, and preferably, the methane is slowly added into the liquid sulfur in the process of introducing the liquid sulfur into the gasification device so as to save time. In a specific embodiment of the invention, liquid sulfur enters a gasification device at a certain speed for gasification, and in the introduction process, gaseous methane is introduced into the injection tube of the liquid sulfur to ensure that the methane is introduced slowly into the liquid sulfur wherein the introduction time for the gaseous methane is less than or equal to that for the liquid sulfur, and preferably, the introduction time for the gaseous methane is equal to that for the liquid sulfur. The adding speed of the methane can be adjusted in practical production according to the introduction speed of liquid sulfur and the mass ratio of liquid sulfur and stabilizer.

Furthermore, the specific preparation steps of the liquid sulfur heating and gasification stage comprise: methane is slowly introduced into the liquid sulfur, and then the liquid sulfur mixed with the methane is heated to the gasification temperature to obtain mixed gas, which can also be called sulfur vapor containing stabilizer. Along with the gasification of the sulfur, the methane and the sulfur vapor are uniformly mixed, thereby saving time.

Furthermore, the preparation method for the insoluble sulfur also comprises steps of quenching, solidifying, extracting, filtering, drying, screening, oil filling and the like, and after the sulfur is heated and gasified, the obtained sulfur vapor containing stabilizer is subjected to the steps of quenching, solidifying, extracting, filtering, drying, screening, oil filling and the like to obtain the insoluble sulfur. In the stage of sulfur heating and gasification, methane is cracked into active free radicals under the action of sulfur vapor active free radicals, and finally the sulfur vapor containing stabilizer is obtained via gasification, wherein the sulfur vapor containing stabilizer can also be viewed as mixed gas of the sulfur vapor and the active free radicals after methane cracking.

Furthermore, the gasification temperature of the liquid sulfur is 450-700° C., and preferably 500-600° C. The liquid sulfur can be obtained by melting solid sulfur at the temperature of 120-140° C.

Furthermore, quenching, solidifying, extracting, filtering, drying, screening, and oil filling processes are disclosed in the prior art, and the quenching, solidifying, extracting, filtering, drying, screening, and oil filling processes disclosed in the prior art can be used in the invention, and will not be described in detail herein.

Furthermore, the containers or reactors used in the gasification, quenching, solidification, extraction, filtration, drying, screening and oil filling stages of the insoluble sulfur adopt the equipment or devices disclosed in the prior art.

The invention employees methane as the anti reversion stabilizer, which is added to liquid sulfur at sulfur gasification stage, and is cracked into active free radicals under the action of sulfur vapor active free radicals; in the quenching process of sulfur vapor mixed with methane, the active free radicals generated by methane cracking carry out end capping on insoluble sulfur end groups generated by sulfur vapor polymerization, thus completing insoluble sulfur stabilization. The methane is added at liquid sulfur gasification stage, and after sulfur gasification, the methane is mixed with sulfur vapor in a gaseous form, rather than being added to the product in a solid or liquid manner at a later stage, so that the insoluble sulfur and the stabilizer can be uniformly contacted and mixed to the greatest extent, the stabilizing process and the mixing difficulty of the stabilizer are reduced, and the production efficiency is improved; moreover, the adding of stabilizer at early stage of production better prevent the insoluble sulfur from reversion, and improve product quality.

The invention has following advantageous effects:

1. The invention takes methane as a stabilizer, and provides a new choice for the stabilizer of insoluble sulfur. the active free radicals generated by methane cracking carry out end capping on insoluble sulfur end groups generated by sulfur vapor polymerization, a small amount of methane which does not participate in the reaction is discharged along with the air in the quenching process for tail gas treatment, free from generating three-waste products and greatly reducing the pollution of the production process to the environment.

2. The methane is mixed with sulfur vapor in a gaseous form, rather than being added to the product in a solid or liquid manner at a later stage, so that the insoluble sulfur and the stabilizer can be uniformly contacted and mixed to the greatest extent, the stabilizing process and the mixing difficulty of the stabilizer are reduced; it is easy to operate and implement and favorable to improve production efficiency; moreover, the adding of stabilizer at early stage of production better prevent the insoluble sulfur from reversion, and improve product quality.

3. Methane is cracked into active free radicals under the action of sulfur vapor active free radicals, and in the process of quenching sulfur vapor, the active free radicals generated by methane cracking carry out end capping on insoluble sulfur end groups generated by sulfur vapor polymerization, thus completing the process of stabilizing insoluble sulfur. The gaseous free radicals formed by the methane do not remain in the product in the form of free radicals, so black spots are not formed and the appearance quality of insoluble sulfur is not influenced.

DETAILED DESCRIPTION OF THE PREFERRED EMBODIMENTS

The invention will be described in further detail with reference to specific embodiments. However, these specific embodiments are only for explaining the invention and are not intended to limit the invention.

Embodiment 1

10 tons of 120-140° C. liquid sulfur is input into the gasification furnace at the speed of 5 tons/hour, 0.1 kilogram of gaseous methane is input into a liquid sulfur pipeline (namely a pipeline for inputting the liquid sulfur into the gasification furnace) at the speed of 0.05 kilogram/hour via a mass flow meter in the process of inputting the liquid sulfur, the temperature is raised to 550° C. for gasification after the liquid sulfur is completely added, and the gaseous methane is cracked into active free radicals under the action of sulfur vapor active free radicals. After gasification, uniformly mixed gas in the gasification furnace is introduced into carbon disulfide quenching liquid, in the quenching process, the active free radicals generated by methane cracking carry out end capping on insoluble sulfur end groups generated by sulfur vapor polymerization, thus completing insoluble sulfur stabilization process; performing solidification after quenching, then obtaining solid particles by carbon disulfide extraction and centrifugal separation, and have solid particles washed by carbon disulfide, dried and filled with oil to obtain insoluble sulfur finished products. The obtained product is bright yellow and has no black spots.

Embodiment 2

10 tons of 120-140° C. liquid sulfur is input into the gasification furnace at the speed of 5 tons/hour, 1 kilogram of gaseous methane is input into a liquid sulfur pipeline at the speed of 0.5 kilogram/hour via a mass flow meter in the process of inputting the liquid sulfur, the temperature is raised to 550° C. for gasification after the liquid sulfur is completely added, and the gaseous methane is cracked into active free radicals under the action of sulfur vapor active free radicals. After gasification, uniformly mixed gas in the gasification furnace is introduced into carbon disulfide quenching liquid, in the quenching process, the active free radicals generated by methane cracking carry out end capping on insoluble sulfur end groups generated by sulfur vapor polymerization, thus completing insoluble sulfur stabilization process; performing solidification after quenching, then obtaining solid particles by carbon disulfide extraction and centrifugal separation, and have solid particles washed by carbon disulfide, dried and filled with oil to obtain insoluble sulfur finished products. The obtained product is bright yellow and has no black spots.

Embodiment 3

10 tons of 120-140° C. liquid sulfur is input into the gasification furnace at the speed of 5 tons/hour, 10 kilogram of gaseous methane is input into a liquid sulfur pipeline at the speed of 5 kilogram/hour via a mass flow meter in the process of inputting the liquid sulfur, the temperature is raised to 550° C. for gasification after the liquid sulfur is completely added, and the gaseous methane is cracked into active free radicals under the action of sulfur vapor active free radicals. After gasification, uniformly mixed gas in the gasification furnace is introduced into carbon disulfide quenching liquid, in the quenching process, the active free radicals generated by methane cracking carry out end capping on insoluble sulfur end groups generated by sulfur vapor polymerization, thus completing insoluble sulfur stabilization process; performing solidification after quenching, then obtaining solid particles by carbon disulfide extraction and centrifugal separation, and have solid particles washed by carbon disulfide, dried and filled with oil to obtain insoluble sulfur finished products. The obtained product is bright yellow and has no black spots.

Embodiment 4

10 tons of 120-140° C. liquid sulfur is input into the gasification furnace at the speed of 5 tons/hour, 1 kilogram of gaseous methane is input into a liquid sulfur pipeline at the speed of 0.5 kilogram/hour via a mass flow meter in the process of inputting the liquid sulfur, the temperature is raised to 500° C. for gasification after the liquid sulfur is completely added, and the gaseous methane is cracked into active free radicals under the action of sulfur vapor active free radicals. After gasification, uniformly mixed gas in the gasification furnace is introduced into carbon disulfide quenching liquid, in the quenching process, the active free radicals generated by methane cracking carry out end capping on insoluble sulfur end groups generated by sulfur vapor polymerization, thus completing insoluble sulfur stabilization process; performing solidification after quenching, then obtaining solid particles by carbon disulfide extraction and centrifugal separation, and have solid particles washed by carbon disulfide, dried and filled with oil to obtain insoluble sulfur finished products. The obtained product is bright yellow and has no black spots.

Embodiment 5

10 tons of 120-140° C. liquid sulfur is input into the gasification furnace at the speed of 5 tons/hour, 1 kilogram of gaseous methane is input into a liquid sulfur pipeline at the speed of 0.5 kilogram/hour via a mass flow meter in the process of inputting the liquid sulfur, the temperature is raised to 600° C. for gasification after the liquid sulfur is completely added, and the gaseous methane is cracked into active free radicals under the action of sulfur vapor active free radicals. After gasification, uniformly mixed gas in the gasification furnace is introduced into carbon disulfide quenching liquid, in the quenching process, the active free radicals generated by methane cracking carry out end capping on insoluble sulfur end groups generated by sulfur vapor polymerization, thus completing insoluble sulfur stabilization process; performing solidification after quenching, then obtaining solid particles by carbon disulfide extraction and centrifugal separation, and have solid particles washed by carbon disulfide, dried and filled with oil to obtain insoluble sulfur finished products. The obtained product is bright yellow and has no black spots.

Comparative Embodiment 1

Preparing insoluble sulfur according to method proposed in Embodiment 1, but the difference is that methane is not added, which comprises following steps:

10 tons of 120-140° C. liquid sulfur is input into the gasification furnace at the speed of 5 tons/hour; the temperature is raised to 550° C. for gasification and the obtained sulfur vapor is introduced into carbon disulfide quenching liquid for quenching; performing solidification after quenching, then obtaining solid particles by carbon disulfide extraction and centrifugal separation, and have solid particles washed by carbon disulfide, dried and filled with oil to obtain insoluble sulfur finished products.

The invention adopts methane as the anti-reversion stabilizer, reduces the reversion property of insoluble sulfur at high temperature, and improves the high-temperature stability of the insoluble sulfur. Moreover, the methane is in a gaseous state, is added before the sulfur is gasified, and is in direct contact with sulfur steam without being blocked by other substances, therefore it is easier to mix uniformly, reduces the mixing difficulty, shortens the reaction time and improves the production efficiency. In order to verify the performance of the insoluble sulfur in the invention, the content of the Insoluble Sulfur (IS) at different temperatures of the above embodiments and comparative embodiment was measured, and the results are shown in Table 1 below.

TABLE 1

|  | Insoluble sulfur yield | IS content after heating for 15 min at 105° C. | IS content after heating for 15 min at 120° C. |
| --- | --- | --- | --- |
| Embodiment 1 | 42% | 83% | 59% |
| Embodiment 2 | 48% | 82% | 58% |
| Embodiment 3 | 50% | 80% | 52% |
| Embodiment 4 | 45% | 80% | 57% |
| Embodiment 5 | 48% | 83% | 58% |
| Comparative embodiment 1 | 40% | 79% | 50% |

What is claimed is:

1. The anti-reversion stabilizer for insoluble sulfur wherein the effective component thereof is methane.

2. A preparation method for the insoluble sulfur comprising the steps of heating and gasifying the liquid sulfur to obtain sulfur vapor, wherein the methane is firstly added into the liquid sulfur, and then the liquid sulfur is gasified.

3. The preparation method of claim 2 wherein the mass ratio of the methane to the liquid sulfur is 10-3~10-5:1.

4. The preparation method of claim 2 wherein the methane is introduced into the liquid sulfur.

5. The preparation method of claim 2 wherein the methane is introduced in the process of introducing the liquid sulfur into the gasification device.

6. The preparation method of claim 5 wherein the time for introducing gaseous methane into liquid sulfur is less than or equal to that for introducing liquid sulfur into the gasification device.

7. The preparation method of claim 2 wherein the specific preparation steps of the liquid sulfur heating and gasification stage comprise: methane is slowly introduced into the liquid sulfur, and then the liquid sulfur mixed with the methane is heated to the gasification temperature to obtain mixed gas.

8. The preparation method of claim 2 wherein the gasification temperature of the liquid sulfur is 450-700° C.

9. The preparation method of claim 8 wherein the gasification temperature of the liquid sulfur is 500-600° C.

* * * * *